United States Patent
Turbiner

(10) Patent No.: US 10,656,244 B2
(45) Date of Patent: May 19, 2020

(54) RECONFIGURABLE CORRELATOR (PULSE COMPRESSION RECEIVER) AND BEAM FORMER BASED ON MULTI-GIGABIT SERIAL TRANSCEIVERS (SERDES)

(71) Applicant: General Radar Corp., Palo Alto, CA (US)

(72) Inventor: Dmitry Turbiner, Palo Alto, CA (US)

(73) Assignee: General Radar Corp., Menlo Park, CA (US)

(*) Notice: Subject to any disclaimer, the term of this patent is extended or adjusted under 35 U.S.C. 154(b) by 254 days.

(21) Appl. No.: 15/406,113

(22) Filed: Jan. 13, 2017

(65) Prior Publication Data

US 2017/0293018 A1    Oct. 12, 2017

Related U.S. Application Data

(60) Provisional application No. 62/320,159, filed on Apr. 8, 2016.

(51) Int. Cl.
*G01S 7/32* (2006.01)
*G01S 17/26* (2020.01)
(Continued)

(52) U.S. Cl.
CPC .......... *G01S 7/32* (2013.01); *G01S 7/285* (2013.01); *G01S 7/486* (2013.01); *G01S 7/487* (2013.01); *G01S 13/288* (2013.01); *G01S 17/26* (2020.01)

(58) Field of Classification Search
CPC ........ G01S 7/32; G01S 17/102; G01S 13/288; G01S 7/487; G01S 7/285; G01S 7/486;
(Continued)

(56) References Cited

U.S. PATENT DOCUMENTS 3,170,158 A    2/1965 Rotman
3,680,137 A    7/1972 Wright
(Continued)

FOREIGN PATENT DOCUMENTS

CN    102780490 A    11/2012
DE    102011056963 B3 *  9/2012  ............. G01S 7/487
(Continued)

OTHER PUBLICATIONS

International Search Report and Written Opinion for Application No. PCT/US2017/026545, dated Jun. 19, 2017. (17 pages).
(Continued)

*Primary Examiner* — Bernarr E Gregory
(74) *Attorney, Agent, or Firm* — Davis Malm & D'Agostine, P.C.; David J. Powsner

(57) ABSTRACT

Aspects of the invention provide improvements to electromagnetic and other wave-based ranging systems, e.g., RADAR or LIDAR systems, of the type having transmit logic that transmits a pulse based on an applied analog signal. The improvements are characterized, in part, by a SERDES having a serializer (a/k/a a "transmit side") that is coupled to the transmit logic. The serializer has (i) an input to which a pattern on which the pulse is based is applied and (ii) an output from which a serialization of the pattern is applied to the transmit logic. The improvements are further characterized in that the SERDES has deserializer logic (a/k/a a "receive side") that is coupled to receive logic and that deserialize a received "analog" signal containing possible reflections of the pulse.

50 Claims, 13 Drawing Sheets

(51) Int. Cl.
*G01S 13/28* (2006.01)
*G01S 7/285* (2006.01)
*G01S 7/487* (2006.01)
*G01S 7/486* (2020.01)
*G01S 13/00* (2006.01)

(58) Field of Classification Search
CPC ........ G01S 13/32; G01S 17/26; G06F 7/5443;
G06F 7/4836; G06F 7/483
See application file for complete search history.

(56) References Cited

U.S. PATENT DOCUMENTS

| | | | |
|---|---|---|---|
| 3,887,918 A | 6/1975 | Bailey et al. | |
| 4,237,461 A | 12/1980 | Cantrell et al. | |
| 4,359,736 A | 11/1982 | Lewis | |
| 4,373,190 A | 2/1983 | Lewis et al. | |
| 4,400,790 A | 8/1983 | Chambers et al. | |
| 4,408,205 A | 10/1983 | Hockham | |
| 4,509,051 A | 4/1985 | Lewis | |
| 4,513,288 A | 4/1985 | Weathers et al. | |
| 4,513,289 A | 4/1985 | Kretschmer | |
| 4,559,607 A * | 12/1985 | Lu | H04B 1/707 375/E1.002 |
| 4,566,011 A | 1/1986 | Lewis et al. | |
| 4,661,819 A | 4/1987 | Lewis | |
| 4,707,839 A * | 11/1987 | Andren | H04B 1/707 375/150 |
| 4,813,006 A * | 3/1989 | Burns | G01S 13/288 342/189 |
| 4,833,479 A * | 5/1989 | Carlson | G01S 13/288 342/194 |
| 5,038,365 A | 8/1991 | Belloc et al. | |
| 5,216,691 A * | 6/1993 | Kaufmann | H04B 1/707 375/150 |
| 5,321,409 A * | 6/1994 | Walker | G01S 13/288 342/202 |
| 5,568,150 A * | 10/1996 | Taylor, Jr. | G01S 13/282 342/135 |
| 5,677,697 A | 10/1997 | Lee et al. | |
| 5,768,306 A * | 6/1998 | Sawahashi | H04B 1/7075 370/342 |
| 6,208,285 B1 * | 3/2001 | Burkhardt | G01S 13/282 342/132 |
| 6,581,086 B1 | 6/2003 | Morrison et al. | |
| 6,653,957 B1 | 11/2003 | Patterson et al. | |
| 6,693,580 B1 | 2/2004 | Wehling | |
| 6,867,693 B1 | 3/2005 | Radin | |
| 7,023,374 B2 | 4/2006 | Jossef et al. | |
| 7,039,134 B1 * | 5/2006 | Avital | H04B 1/707 375/140 |
| 7,432,806 B2 | 10/2008 | Radin | |
| 7,656,325 B1 * | 2/2010 | Andreev | H03K 5/135 341/100 |
| 7,656,341 B2 * | 2/2010 | Reeves | G01S 13/32 342/195 |
| 7,787,533 B2 | 8/2010 | Atherton | |
| 7,793,013 B1 | 9/2010 | Esposito | |
| 7,952,516 B2 | 5/2011 | Atherton | |
| 8,095,085 B2 | 1/2012 | Song et al. | |
| 8,253,622 B2 | 8/2012 | Hampel et al. | |
| 8,717,224 B2 | 5/2014 | Jeong | |
| 8,730,084 B2 | 5/2014 | Al-Khalefah et al. | |
| 9,203,597 B2 | 12/2015 | Wolcott et al. | |
| 9,252,809 B2 | 2/2016 | Hirth | |
| 9,575,160 B1 | 2/2017 | Davis et al. | |
| 2002/0122503 A1 | 9/2002 | Agazzi | |
| 2005/0135467 A1 * | 6/2005 | Asuri | H03H 21/0012 375/232 |
| 2005/0135468 A1 * | 6/2005 | Asuri | H03H 21/0012 375/232 |
| 2005/0180491 A1 | 8/2005 | Hiromori | |
| 2005/0285773 A1 | 12/2005 | Hartzstein et al. | |
| 2008/0037594 A1 | 2/2008 | Hornbuckle et al. | |
| 2008/0204309 A1 * | 8/2008 | Reeves | G01S 13/32 342/195 |
| 2008/0304551 A1 * | 12/2008 | Li | H04B 1/707 375/140 |
| 2011/0058596 A1 | 3/2011 | Agazzi et al. | |
| 2012/0146842 A1 | 6/2012 | Kang | |
| 2012/0157852 A1 | 6/2012 | Wegener et al. | |
| 2012/0176159 A1 | 7/2012 | Webb, III et al. | |
| 2012/0176174 A1 * | 7/2012 | Webb, III | G06F 1/025 327/237 |
| 2012/0179422 A1 * | 7/2012 | Webb, III | G01R 31/31725 702/187 |
| 2012/0200453 A1 | 8/2012 | Brosche | |
| 2012/0313820 A1 | 12/2012 | Tyree | |
| 2013/0027240 A1 | 1/2013 | Chowdhury | |
| 2013/0157729 A1 | 6/2013 | Tabe | |
| 2015/0359443 A1 | 12/2015 | Poh | |
| 2018/0059215 A1 | 3/2018 | Turbiner et al. | |

FOREIGN PATENT DOCUMENTS

| | | |
|---|---|---|
| WO | 2008/082917 A2 | 7/2008 |
| WO | 2011/128882 A1 | 10/2011 |

OTHER PUBLICATIONS

International Preliminary Report on Patentability for Application No. PCT/US2017/026545, dated Oct. 18, 2018. (12 pages).
Invitation to Pay Additional Fees for Application No. PCT/US2017/026715, dated Jun. 23, 2017. (2 pages).
International Search Report and Written Opinion for Application No. PCT/US2017/026715, dated Aug. 25, 2017. (25 pages).
International Preliminary Report on Patentability for Application No. PCT/US2017/026715, dated Oct. 18, 2018. (15 pages).
Lee, K.-Y., et al., "Full-CMOS 2-GHz WCDMA direct conversion transmitter and receiver," IEEE J. Solid-State Circuits 38(1), 43-53, 2003.
Morschbach, M., et al., "Integrated Antennas on HR Silicon for Single Chip Automotive Radar Applications," Proc. 38th Eur. Microwave Conf., 2008, pp. 959-962.
Seguin, E., et al., "A Dynamically-Reconfigurable Phased Array Radar Processing System," Department of Electrical and Computer Engineering, Univ. of Mass., Amherst, FPL '11 Proceedings of the 2011 21st International Conference on Field Programmable Logic and Applications, pp. 258-263.
Yu, Y., et al., "A new UWB radar system using UWB CMOS chip," Proceedings of the 5th European Conference on Antennas and Propagation, EUCAP 2011. Rome, Apr. 11-15, 2011 p. 771-775. (2011).
deGraaf, J. W. and Cantrell, B. H., "Digital Array Radar: A New Vision," in 2002 NRL (Naval Research Laboratory) Review, pp. 121-122.
The Handbook of Antenna Design, vol. I, eds. A. W. Rudge et al., 1982, Peter Peregrinus Ltd., London, UK, pp. 310-311.
Supplementary Partial European Search Report and Provisional Opinion, dated Jan. 20, 2020, European Application No. 1777995.

* cited by examiner

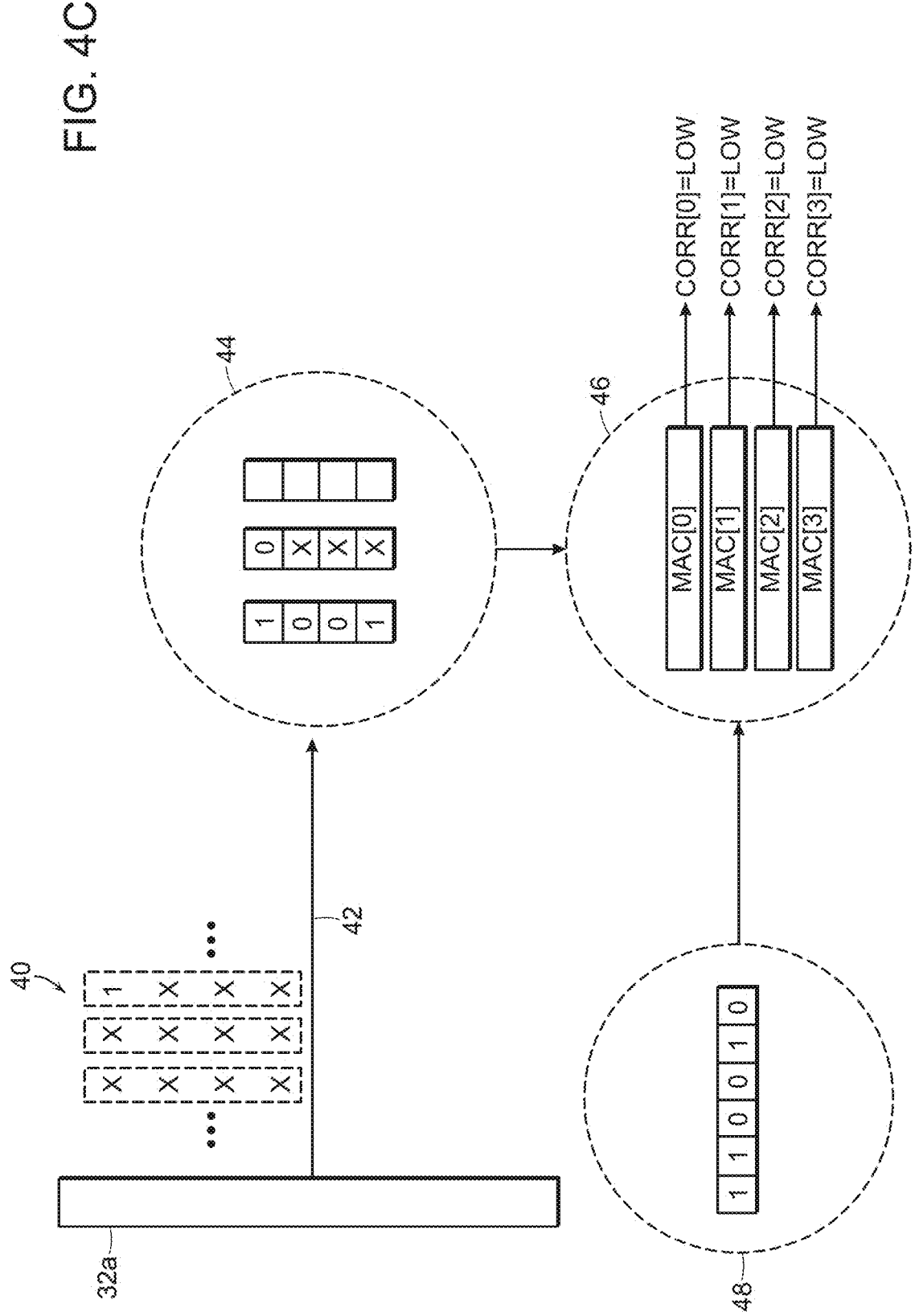

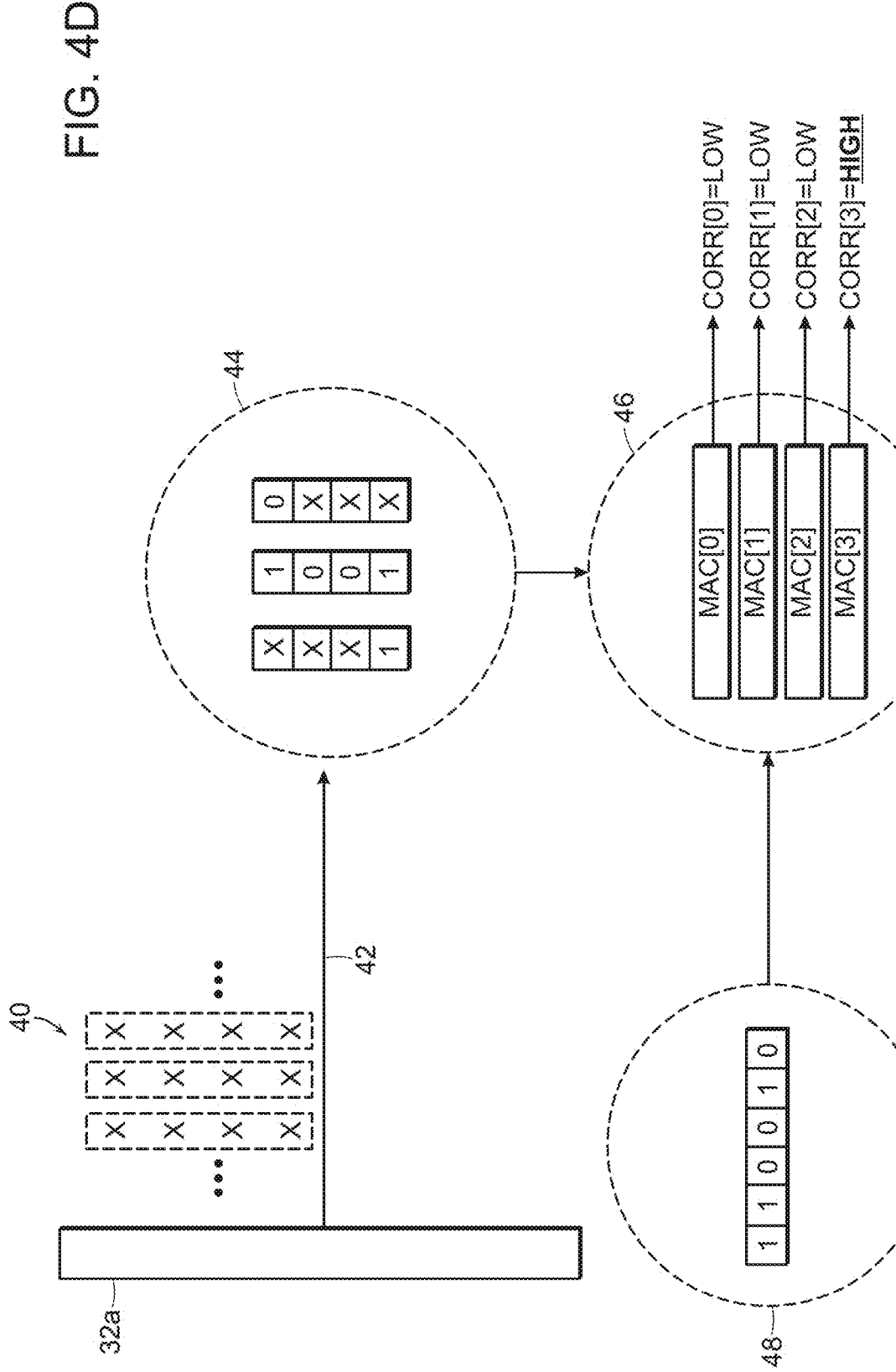

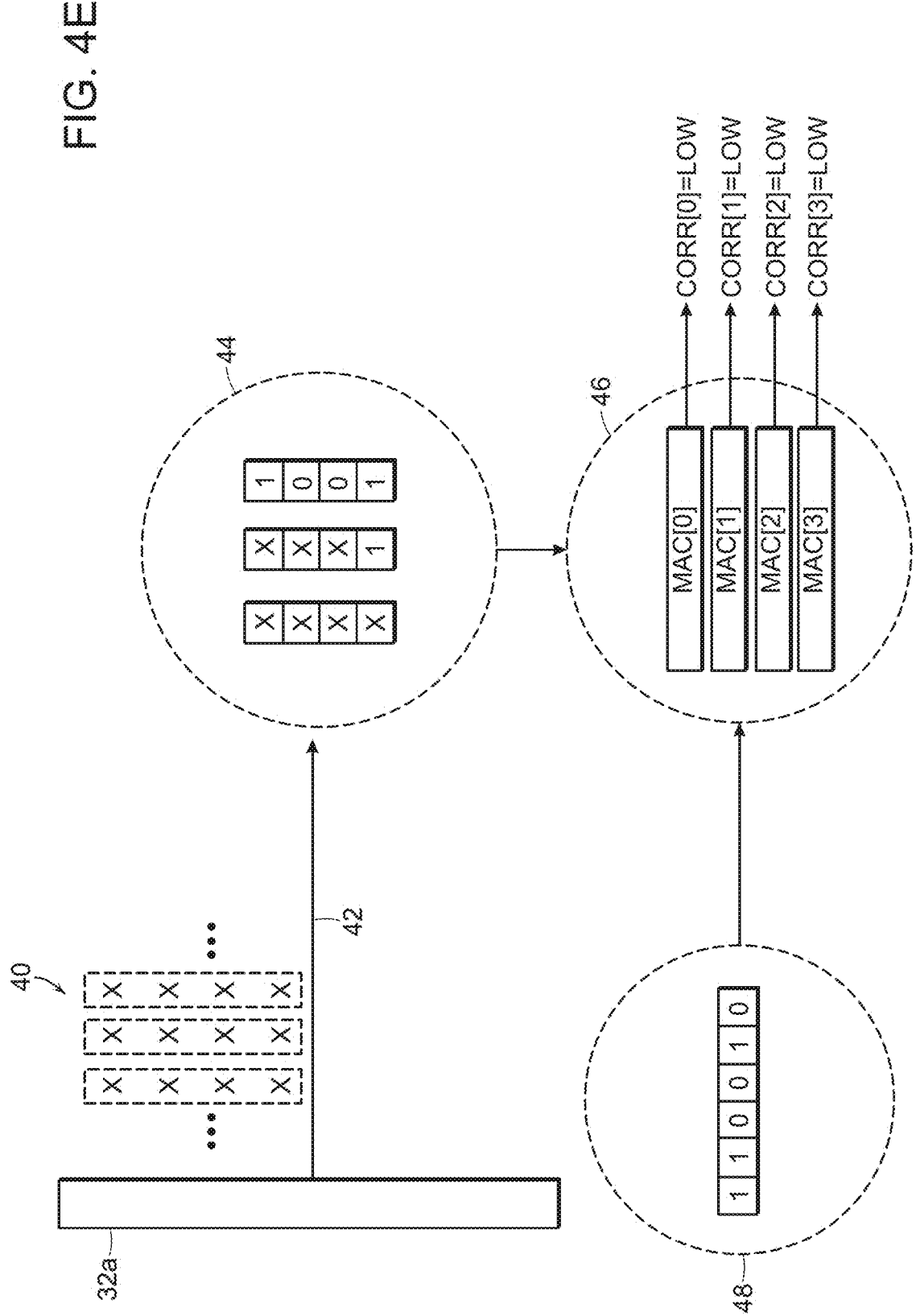

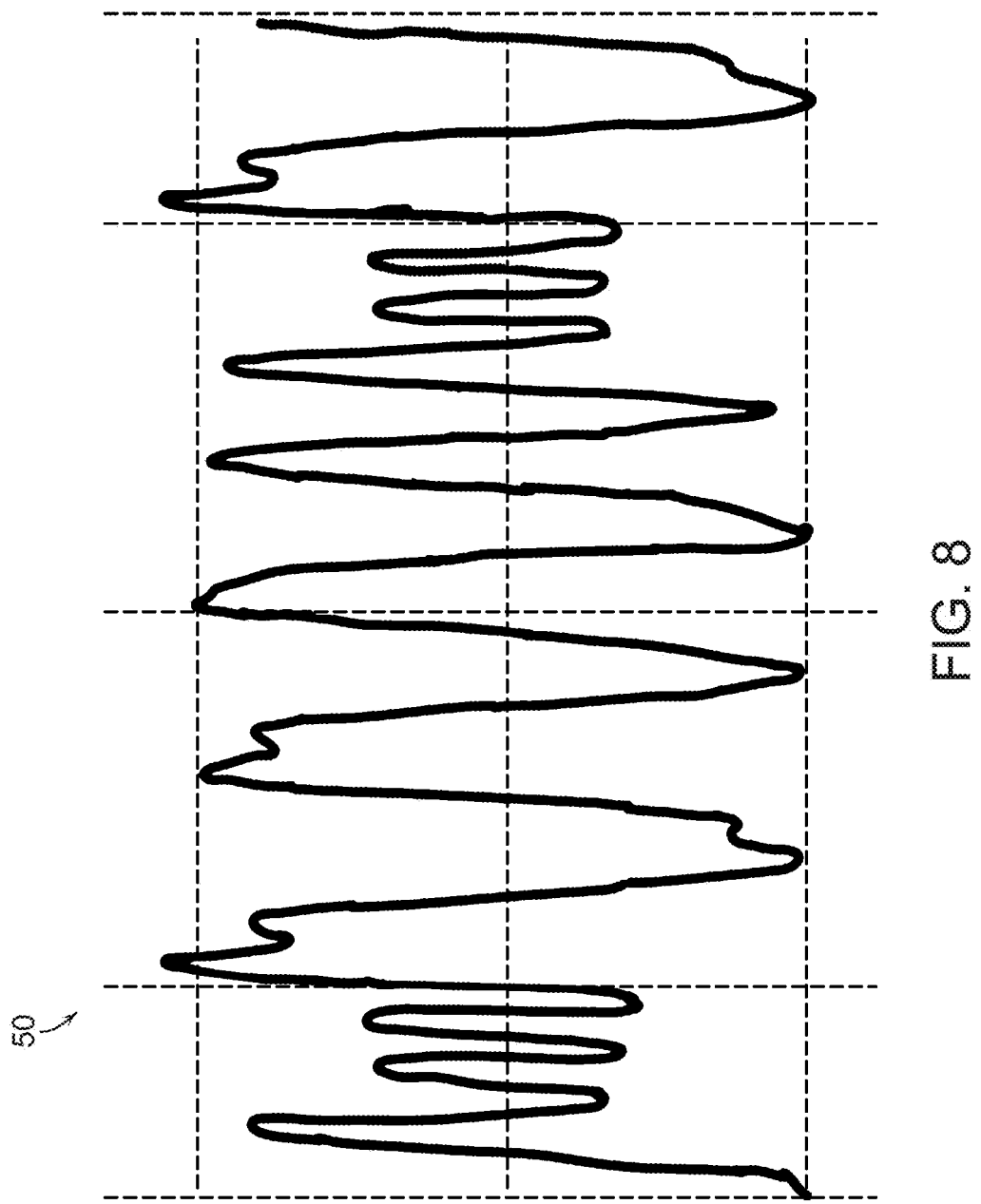

RECONFIGURABLE CORRELATOR (PULSE COMPRESSION RECEIVER) AND BEAM FORMER BASED ON MULTI-GIGABIT SERIAL TRANSCEIVERS (SERDES)

This application claims the benefit of filing of U.S. Provisional Patent Application Ser. No. 62/320,159, filed Apr. 8, 2016, entitled A Reconfigurable Correlator (Pulse Compression Receiver) and Beam Former Based on Multi-Gigabit Serial Transceivers (SERDES), the teachings of which are incorporated herein by reference.

BACKGROUND OF THE INVENTION

The invention pertains to signal processing and, more particularly, to pulse compression receivers and correlators. The invention has application in RADAR, LIDAR and other range-finding systems of the type employed, by way of non-limiting example, in autonomous vehicles such as self-driving cars, as well as in wireless communications modems of the type employed, by way of non-limiting example, in Massive-MIMO (multiple-in-multiple-out) networks such as 5G wireless telecommunications, all by way of non-limiting example.

Range-finding systems use reflected waves to discern, for example, the presence, distance and/or velocity of objects. Although sound-based ranging has been used in nature for millions of years, mankind did not discover how to harness it and radio frequency-based ranging (RADAR) until the late nineteenth and early twentieth centuries. Laser-based ranging (LIDAR) followed advent of the laser itself, in the 1960's.

Fundamental to automated ranging systems is broadcasting a pulse into the environment and matching it with incoming signals to determine whether they contain reflections of the pulse off objects of potential interest. Though easily stated, the practice of this is anything but. In part, this is because the range-resolution of the reflections is inversely proportional to the transmitted pulse's bandwidth. The higher the bandwidth, the smaller (i.e., the finer) the range-resolution. While this favors short pulses (which tend to be of high bandwidth), they typically result in very complex receiver and transmitter architectures and in limited signal-to-noise ratios. (As those skilled in the art will appreciate, the signal-to-noise ratio (SNR) can be expressed by the relation SNR=Pulse energy/Noise Energy. Noise Energy, in turn, is proportional to the receiver's band-width (k×T× BW). This is why the SNR is weaker for higher band designs.) Longer pulses (which tend to be of lower bandwidth) simplify instrument design and implementation and improve signal-to-noise ratios for the same power levels, yet, with reduced resolution.

Pulse compression is a technique that gets the best of both worlds. By modulating the transmitted signal, e.g., varying the frequency within each pulse or by coding the phase of a continuous-wave signal, this technique can provide the improved signal strength of longer, lower-power pulses with the improved resolution of shorter pulses. For example, by embedding a known a-priori pattern into each pulse, the arrival time of its reflection—and, therefore, the range of the object from which that reflection has occurred—can be resolved with greater precision by finding the point of highest correlation between the pulse pattern and the incoming reflection signals. In other words, very fine range resolution can now be achieved with long pulse durations.

Although it has proven a boon to the art, pulse compression can prove expensive to implement, esp., for example, at speeds necessary to support range finding for commercial autonomous vehicle operation.

In view of the foregoing, an object of the invention is to provide improved methods and apparatus for signal processing.

Related objects are to provide improved methods and apparatus for signal correlation and for pulse compression.

A further related object of the invention is to provide such improved methods and apparatus as can be applied in range-finding, wireless communications and other applications.

A further object of the invention is to provide improved such methods and apparatus as are suitable for use with RADAR, LIDAR and other range-finding technologies.

A still further object of the invention is to provide improved methods and apparatus for transmitting and receiving pulses and their reflections in such range-finding systems.

Still yet another object of the invention is to provide an improved correlator and methods of operation thereof for use with such range-finding and other systems.

Yet still another object of the invention is to provide such an improved correlator and methods as are reconfigurable.

SUMMARY OF THE INVENTION

The foregoing are among the objects of the invention, which provides in some aspects improvements in a signal correlator of the type having logic that correlates a signal pattern with an applied signal. The improvement is characterized by a serializer/deserializer ("SERDES") having a receive side (a/k/a the "deserializer") with an input to which an "analog" signal is applied. The SERDES generates and applies to correlation logic within the correlator digital samples of the analog signal.

According to these aspects of the invention, the SERDES's deserializer operates as an ADC, that is, as an analog to digital converter. It samples the applied "analog" signal and generates a digital stream of values—each, for example, of 1-bit length—representing the amplitude of respective successive samples of the analog signal.

Related aspects of the invention provide an improved signal correlator, e.g., as described above, in which the SERDES samples the applied analog signal at a rate of at least 3 giga samples per second (GSPS) and, preferably, at a rate of at least 28 GSPS. In other related aspects of the invention, the applied analog signal is conditioned to attain a differential amplitude of at least 10 mVpp and, preferably, at least 250 mVpp.

Other aspects of the invention provide an improved signal correlator, e.g., as described above, in which the SERDES is implemented in any of a ASIC and an FPGA. Related aspects of the invention provide such a correlator that is reconfigurable. Still further related aspects of the invention provide an improved signal correlator, e.g., as described above, in which clock-tracking and correction functionality native to the SERDES (and/or the ASIC or FPGA in which it is embodied) are disabled.

According to these aspects of the invention, the signal pattern to be transmitted can be stored in a memory that is field-reprogrammable.

Further aspects of the invention provide a signal correlator, e.g., as described above, in which the correlation logic is made up of a plurality of multiply-and-accumulate (MAC) units, each coupled to receive a respective portion of the digital stream directly or indirectly (e.g., via registers associated with the MAC units) from the deserializer—that is, a respective set of successive (or substantially successive) samples of the "analog" signal. Each respective portion includes at least one sample not in the other portions, and successive portions are overlapping but offset from one another by one or more successive samples (or substantially successive samples).

The MAC units, according to related aspects of the invention, each multiply their respective portion of the digital stream, on a sample-by-sample (e.g., bit-by-bit) basis, with the signal pattern and sum results of those multiplications. In systems and methods operating in accord with these aspects of the invention, higher correlations correspond with larger sums. In alternate aspects of the invention, e.g., in which the samples are 1-bit values, each MAC unit preferably performs Boolean exclusive OR (XOR) operations, instead of multiply operations, and sums (or accumulates) results of those XOR operations. In systems and methods operating in accord with these aspects of the invention, higher correlations correspond with smaller sums (since an XOR operation produces a 0, when compared bits match, and a 1, when compared bits do not match).

Related aspects of the invention provide a signal correlator, e.g., as described above, that processes samples (e.g., from the SERDES) at a rate of at least 3 GSPS and, preferably, at a rate of at least 28 giga samples per second (GSPS).

Further aspects of the invention provide improvements to electromagnetic and other wave-based ranging systems (or range-finding systems—terms that are used synonymously herein), e.g., RADAR or LIDAR systems, of the type having transmit logic that transmits a pulse based on an applied analog signal. The improvement is characterized by a SERDES having a serializer (a/k/a a "transmit side") that is coupled to the transmit logic. The serializer has (i) an input to which a pattern on which the pulse is based is applied and (ii) an output from which a serialization of the pattern is applied to the transmit logic.

In these aspects of the invention, the SERDES's serializer operates as a DAC, that is, as a digital to analog converter. It converts the pattern into a stream of bits that are represented as positive and negative going electric voltage pulses (depending on the value of each respective bit) at the output of the serializer.

Related aspects of the invention provide improved such ranging systems, in which the SERDES performs the aforesaid conversion at a rate of at least 3 GSPS and, preferably, at a rate of at least 28 giga samples per second (GSPS).

In other related aspects, the invention provides an improved range-finding system, e.g., as described above, in which the pattern is selected so that the pulse transmitted by the transmit logic has selected autocorrelation properties. Those can be, according to further related aspects of the invention, a minimal autocorrelation amplitude at any lag other than zero. According to further related aspects of the invention, the pattern can be selected so that a pulse transmitted by the transmit logic is a pseudo-random noise sequence (PRN).

Other aspects of the invention provide an improved ranging system, e.g., as described above, in which the SERDES is implemented in any of a ASIC and an FPGA. In related aspects of the invention, the signal pattern can be stored in a memory that is field-reprogrammable and/or generated on the fly, e.g., with a Linear Feedback Shift Register (LFSR).

Still further aspects of the invention provide improvements to an electromagnetic ranging system, e.g., of the type described above, that includes (i) receive logic that receives an analog signal that is a possible reflection of the pulse and (ii) correlation logic that correlates the received signal with a pattern (or "sequence") on which the transmitted pulse is based.

The improvement is characterized in that the SERDES has deserializer logic (a/k/a a "receive side") that can operate in the manner of a deserializer as discussed above and that has (i) an input to which an analog signal (that is the possible reflection of the pulse) is applied, and (ii) an output from which a deserialization of that analog signal is applied to correlation logic—e.g., as 1-bit digital samples of the received signal.

Still other objects of the invention provide methods for operating correlators and electromagnetic and other wave-based ranging systems as described above.

BRIEF DESCRIPTION OF THE DRAWINGS

A more complete understanding of the invention may be attained by reference to the drawings, in which:

FIGS. 4A-4E depict operation of a correlator of FIG. 2;

FIG. 8 depicts a waveform resulting from transmission of a digital chirp through transmit circuitry of the type shown in FIGS. 1 and 5.

DETAILED DESCRIPTION OF THE ILLUSTRATED EMBODIMENT

Figure 1:
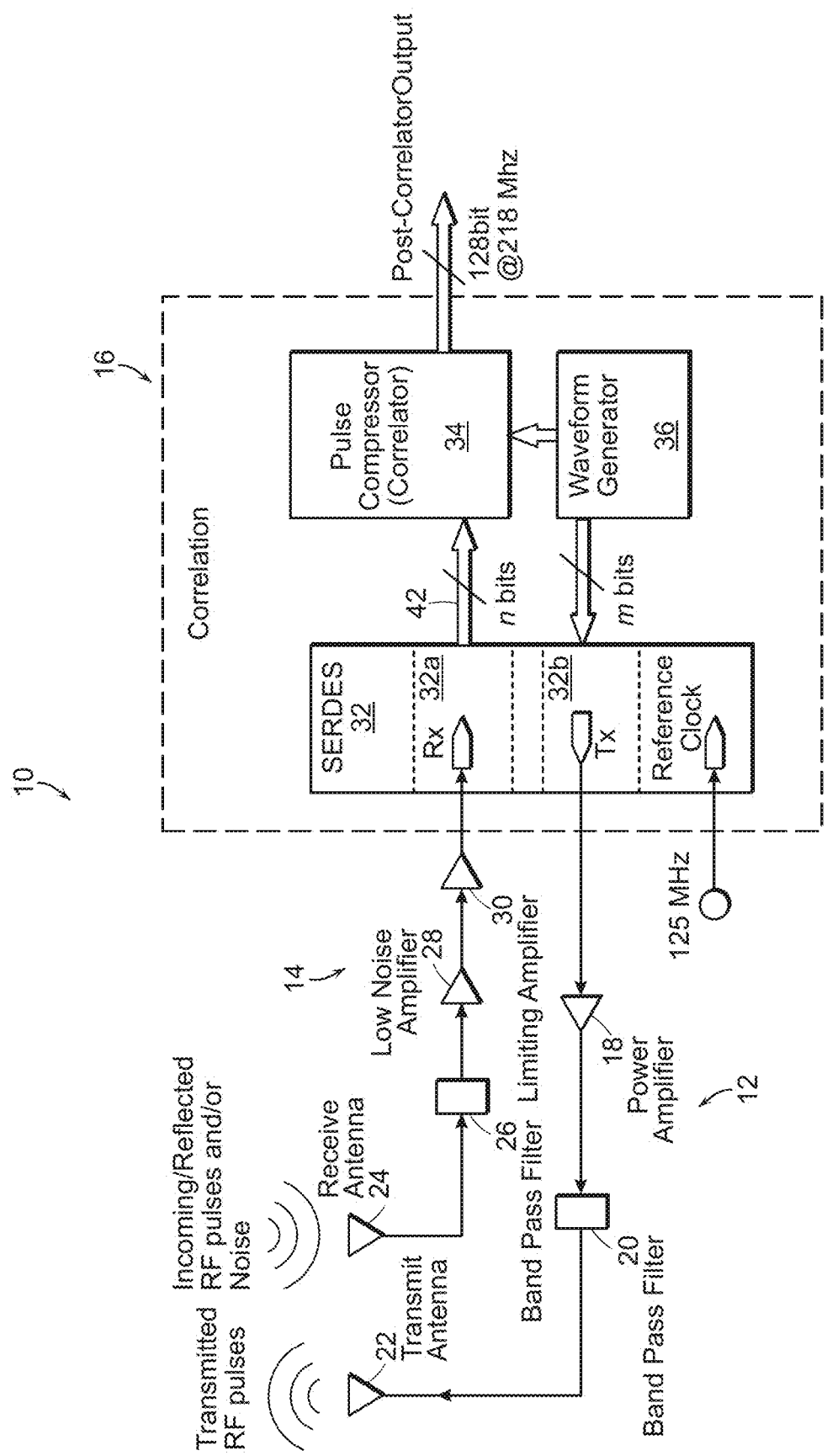
FIG. 1 depicts a range-finding system according to one practice of the invention.

FIG. 1 depicts a range-finding (or "ranging") system 10 according to one practice of the invention. The illustrated system determines the presence, distance, velocity and/or other characteristics of objects using radio frequency pulses, i.e., RADAR; however, it will be appreciated that the teachings hereof are equally applicable to systems that use light-based pulses (LIDAR) and/or that use other forms of waves, such as sound (SONAR). Applications of the illustrated system 10 include, among many others, autonomous and semi-autonomous vehicle guidance (e.g., "self-driving" cars).

Parameters of the illustrated embodiment center around such an application in the discussion below. It will be appreciated that this is by way of example, and that other embodiments—regardless of whether intended for use in supporting such guidance or other applications and regardless of whether utilizing RF or other pulse forms—may employ the same or other operational and design parameters.

Illustrated system 10 includes transmit logic 12, receive logic 14 and correlation logic 16, interconnected as shown in the drawing and further described below.

Transmit Logic

Transmit logic 12 comprises componentry of the type known in the art for use with RADAR systems (and particularly, for example, in pulse compression RADAR systems) to transmit into the environment or otherwise a pulse based on an applied analog signal. In the illustrated embodiment, this is shown as including a power amplifier 18, band pass filter 20 and transmit antenna 22, connected as shown or as otherwise known in the art.

Illustrated elements 18-22 are of the type known in the art of RF pulse transmission, e.g., in RADAR applications, and are selected and configured in the conventional manner known in the art for conditioning the applied signal and transmitting pulses based thereon in accord with a desired application (albeit, as adapted in accord with the teachings hereof).

The components of transmit logic 12 shown here are by way of example. It will be appreciated that other componentry within the ken of those ordinarily skilled in the art suitable for transmission of radio frequency pulses may be used instead or in addition. Moreover, it will be appreciated that alternate componentry, also within the ken of those ordinarily skilled in the art, may be used for embodiments based on LIDAR, SONAR or other wave-based ranging.

Receive Logic

Receive logic 14 comprises componentry of the type known in the art for use with RADAR systems (and particularly, for example, in pulse compression RADAR systems) to receive from the environment (or otherwise) incoming analog signals that represent possible reflections of a transmitted pulse. In point of fact, those signals may often include (or solely constitute) noise. In the illustrated embodiment, the receive logic includes receive antenna 24, band pass filter 26, low noise amplifier 28, and limiting amplifier 30, connected as shown or as otherwise known in the art.

Illustrated elements 24-30 are of the type known in the art of RADAR reception and are selected and configured in the conventional manner known in the art for conditioning incoming signals that contain possible pulse reflections, as well, typically, as noise (all as adapted in accord with the teachings hereof).

The components of receive logic 14 shown here are by way of example. It will be appreciated that other componentry within the ken of those ordinarily skilled in the art suitable for reception of reflected radio frequency pulses may be used instead or in addition. Moreover, it will be appreciated that alternate componentry, also within the ken of those ordinarily skilled in the art, may be used for embodiments based on LIDAR, SONAR or other wave-based ranging.

Correlation Logic

Correlation logic 16 correlates the incoming signals, as received and conditioned by the receive logic 14, with the pulse transmitted by the transmit logic 12 (or, more aptly, in the illustrated embodiment, with the patterns on which that pulse is based) in order to find when, if at all, there is a high correlation between them. Illustrated correlation logic comprises serializer/deserializer (SERDES) 32, correlator 34 and waveform generator 36, coupled as shown (e.g., by logic gates of an FPGA or otherwise) or as otherwise evident in view of the teachings hereof.

Each of elements 32-36 may be stand-alone circuit elements; alternatively, one or more of them may be embodied in a common FPGA, ASIC or otherwise. Moreover, elements 32-36, or any one or more of them, may be embedded on a common FPGA, ASIC or other logic element with one or more of the other elements discussed above, e.g., elements 12-30. When embodied in FPGAs, ASICs or the like, the elements 32-36 provide for sampling and processing of incoming signals at rates of at least 3 giga samples per second (GSPS) and, preferably, at a rate of at least 28 GSPS.

Waveform Generator

The waveform generator 36 generates a multi-bit digital value of length m (which can be, for example, a byte, word, longword or so forth) embodying a pattern on which pulses transmitted by transmit logic 12 are (to be) based. In some implementations, this is a static value. In others, it is dynamic in that it changes periodically or otherwise.

An example of a multi-bit value—or "bit pattern"—generated by the generator 36 is a digital value such as "111000110010," where the 1's indicate when the pulse is "on," and the 0's indicate when the pulse is "off." The pattern embodied in this digital value defines a "chirp" pulse, that is, a pulse that is "on" and "off" for shorter and shorter time periods—here, for illustrative purposes only, on for three ticks, off for three ticks, on for two ticks, off for two ticks, on for one tick and off for one tick (all by way of example), where "tick" refers to a moment of generic length (e.g., a microsecond, a millisecond or so forth).

An example of a dynamic value is a value from a pseudo random noise sequence (PRN), although, those skilled in the art will appreciate that other dynamic values, e.g., with suitable autocorrelation properties, can be used instead or in addition.

The waveform generator 36 can comprise a register (not shown) or other logic suitable for holding the aforesaid multi-bit digital value and applying it to the input of the serializer 32b, as discussed below. That register can comprise, for example, a ROM, and EEPROM or the like, that can be programmed, e.g., "at the factory," "at the shop" or upon other operator action. Alternatively, it can be general- or special-purpose logic (not shown) such as a Linear Feedback Shift Register (LFSR) that changes the value on the fly, e.g., as in the case of a PRN or other dynamic multi-bit digital value, on user request or otherwise. Such general- or special-purpose logic can be implemented, whether in an FPGA, ASIC or otherwise, utilizing skills within the ken of those of ordinary skill in the art in view of the teachings hereof.

Serializer/Deserializer (SERDES)

The illustrated logic 16 includes a serializer deserializer 32 (SERDES) of the type known in the art, as adapted in accord with the teachings hereof. SERDES 32 may be a stand-alone electronic circuit element or one that is embedded, e.g., as an interface unit, in a general- or special-purpose circuit element, e.g., a field programmable gate array (FPGA), an application specific integrated circuit (ASIC), and so forth. In the illustrated embodiment, SERDES 32 is shown as forming part of the correlation unit 16, e.g., along with the pulse compressor 34 and waveform generator 36, and, indeed, in some embodiments, those units reside on a common FPGA (or ASIC). In other embodiments the SERDES 32 may be packaged separately from one or both of those units 34, 36.

As per convention, SERDES 32 includes a deserializer 32a (a/k/a a "receive side") and a serializer 32b (a/k/a a "transmit side"), each with an input and an output. Those inputs and outputs may be leads (e.g., in the case of a stand-alone SERDES), logic paths (in the case of a SERDES embedded in an FPGA) or the like, as is common in the art.

Deserializer

The deserializer 32a is of the type commonly known in the art for accepting a digital signal at its input and converting it to a digital signal of another format at its output, e.g., by "parallelizing" (a/k/a "deserializing") or grouping bits that make up the input signal (for example, converting a stream of bits into a byte, word or longword).

Figure 2:
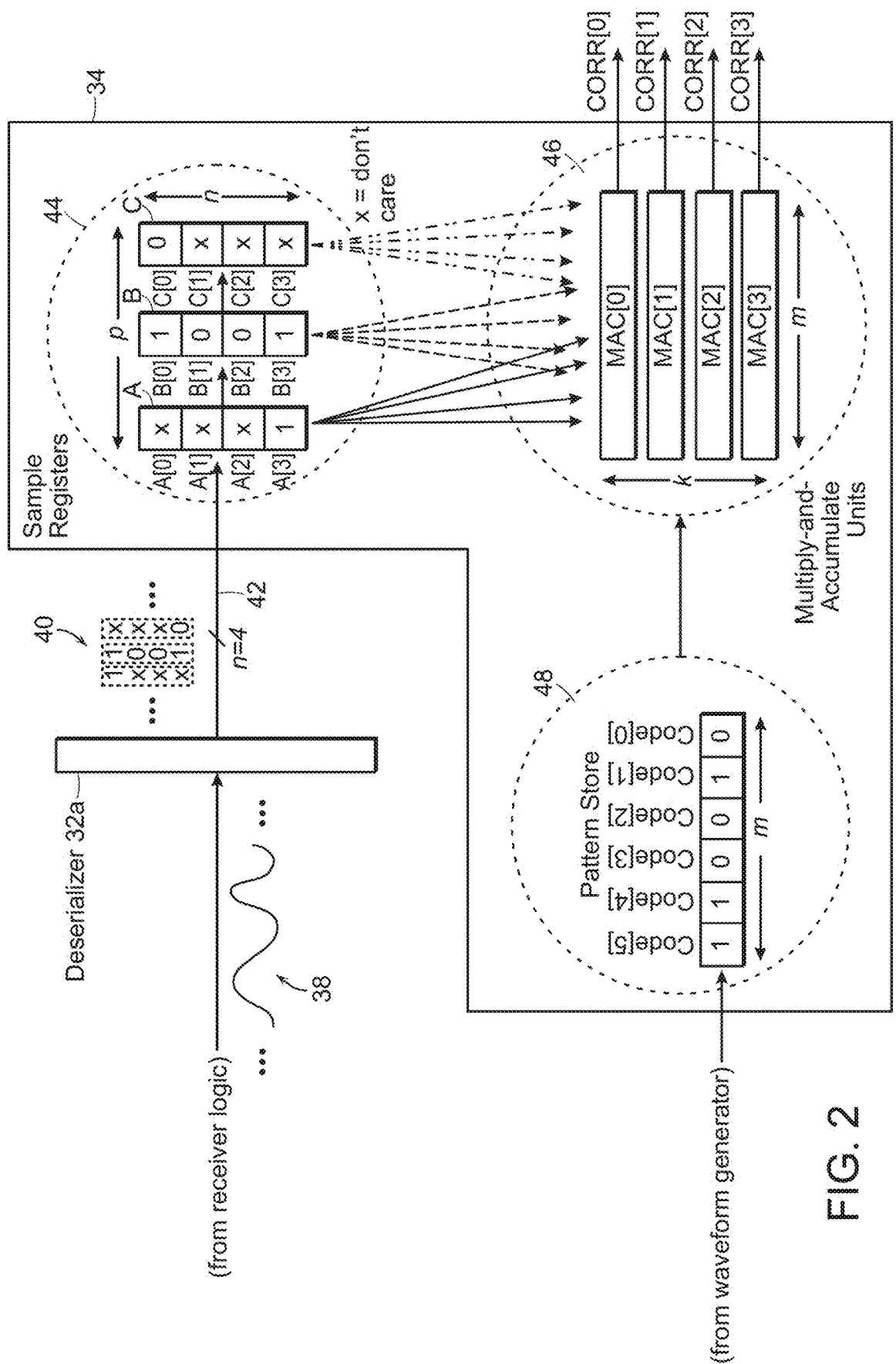
FIG. 2 depicts operation of a correlator in a system of FIG. 1.

The deserializer 32a is coupled to receive logic 14, e.g., as shown in FIGS. 1 and 2, to accept as input signals 38 representing possible reflections of the pulse from objects in the range and path of the range-finding system 10. Those signals 38 might conventionally be considered to be "analog" signals (and are shown as such in FIG. 2) given the manner in which they are received from the environment and processed by the elements of the receive logic 14—esp., for example, in a system 10 in which elements 18-22 are of the type known in the art of RADAR.

The deserializer 32a, however, accepts those "analog" signals at its input as if they were digital and, particularly, in the illustrated embodiment, as if they were a stream of bits, and it groups those bits, e.g., into longwords, at its output. As used herein, the term "longword" refers not only to 32-bit words, but to any multi-bit unit of data. In some preferred embodiments, these are 128-bit words (a/k/a "octawords" or "double quadwords"), but in other embodiments they may be nibbles (4 bits), bytes (8 bits), half-words (16 bits), words (32 bits) or any other multi-bit size.

The deserializer 32a of the illustrated embodiment, thus, operates as a 1-bit ADC (that is, as an analog to digital converter) that, in effect, samples and converts an incoming "analog" signal (received at its input) representing possible reflections of the pulse into a stream of longwords (produced at its output), where the sampling is only for two amplitudes: high (amplitude 1) and low (amplitude 0). The longwords in that stream, thus, embody bit-patterns representing those possible reflections.

Figure 5:
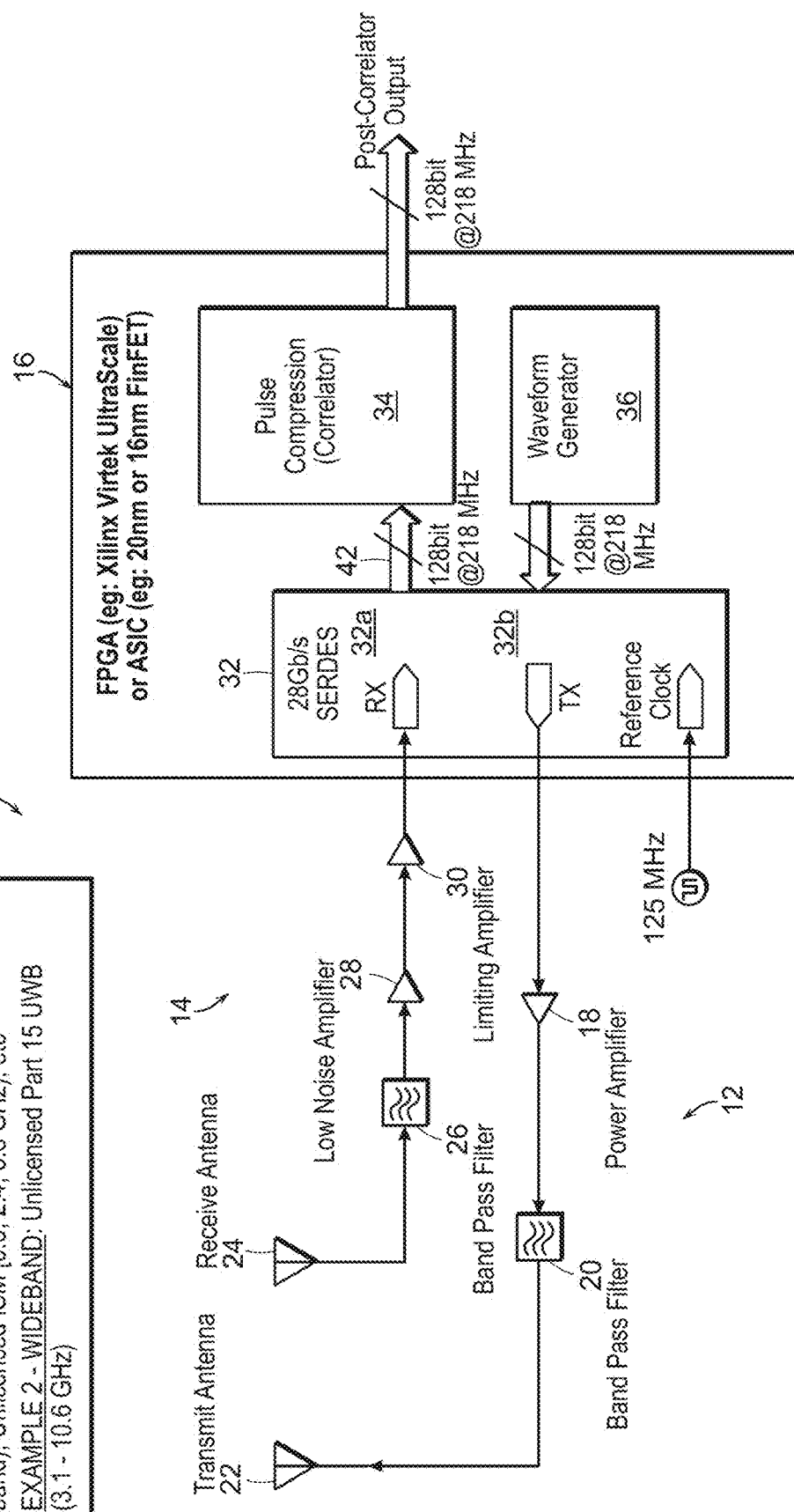
FIGS. 5 and 6 depict, respectively, embodiments of the invention in direct-to-radio frequency and heterodyne—BPSK modulation RADAR applications.

In the embodiment shown in FIG. 2, the deserializer 32a samples and converts (groups) the input signal 38 into a digital stream 40 of 4-bit "longwords" (more properly, "nibbles"), as shown. A circuit path 42 having a width n that, typically, matches the size of those longwords (here, n=4) carries those longwords to registers in the correlator 34. (In some preferred embodiments, such as illustrated in FIG. 5, et seq., the longwords are 128 bits long and path 42 is 128 bits wide, by way of non-limiting example.) As will be appreciated, each successive bit stored in the longwords represents the amplitude of the input signal 38 at a different respective time.

Serializer

Like the deserializer 32a, the serializer 32b is of the type commonly known in the art for accepting a digital signal at its input and converting it to a digital signal of another format at its output, e.g., by serializing or un-grouping bits that make up the input signal (for example, converting an byte, word or longword into a stream of its constituent bits).

The input of the serializer 32b is coupled to the waveform generator 36, which applies to that input a word, long word or other multi-bit digital value embodying a pattern on which pulses transmitted by transmit logic 12 are (to be) based. The serializer 32b serializes or ungroups the multi-bit value at its input and applies it, e.g., as a stream of individual bits, to the transmit logic 12 and, more particularly, in the illustrated embodiment, the power amplifier 18, to be transmitted as a pulse into the environment or otherwise.

Those skilled in the art will appreciate that an analog signal would conventionally be applied to transmit logic 12 for this purpose. The serializer 32b, however, applies its digital output to the logic 12 (here, particularly, the amplifier 18) to be treated as if it were analog and to be transmitted into the environment or otherwise as pulses.

The serializer 32b of the illustrated embodiment, thus, effectively operates as a 1-bit DAC (digital to analog converter) that converts a digital signal applied to it by the waveform generator 36 into a stream of individual bits and that it applies to the transmit logic 12 as if it were an analog signal for amplification and broadcast as pulses by the transmit antenna 22.

Correlator

The correlator 34 correlates the bit-pattern that is embodied in the multi-bit digital value from waveform generator 36 embodying the pattern(s) on which pulses transmitted by transmit logic 12 are based with the bit-patterns representing possible reflections of the pulse embodied in digital stream of longwords produced by the deserializer 32a from the input signal 38. To this end, the correlator 34 searches for the best match, if any, of the pulse bit-pattern (from generator 36) with the bit-patterns embodied in successive portions of the digital stream (from the deserializer 32a) stored in registers that form part of the correlator (or otherwise).

Referring to FIG. 2, in the illustrated embodiment, the correlator 34 comprises sample registers 44, multiply and accumulate (MAC) units 46, and store 48 for the pulse bit-pattern (from generator 36) coupled as shown (e.g., by logic gates of an FPGA or otherwise) or otherwise evident in view of the discussion herein. Each of the elements 44-48 may be stand-alone circuit elements; alternatively, one or more of them may be embodied in a common FPGA, ASIC or otherwise. Moreover, elements 44-48, or any one or more of them, may be embedded on a common FPGA, ASIC or other logic element with the SERDES 32 and/or one or more of the other elements discussed above, e.g., elements 12-30.

Sample Registers

Sample registers 44 store (or "buffer") longwords from the digital stream 40 produced by deserializer 32a long enough that the bit-patterns they contain (representing possible reflections of pulses received by logic 14) can be compared against the pulse bit-pattern (from generator 36). In the illustrated embodiment, a plurality, p, of registers are provided (here, labeled A, B and C). For efficiency, each is sized to accommodate the bits of a single longword output by deserializer 32a in individual 1-bit storage elements (here, labeled A[0] . . . A[3], B[0] . . . B[3], and C[0] . . . C[3]). Thus, for example, where circuit path 42 is of width n (e.g., 4 bits, 128 bits, or so forth), registers 44A-44C are each of that same length n. In other embodiments, the registers may be sized differently, e.g., so that more than one of them is required to accommodate the bits of a single longword output by deserializer 32a or, conversely, so that multiple such longwords are required to fill a single register.

The registers 44, which can be embodied in a stand-alone or common circuit element (as noted above), can be implemented as shift registers (or otherwise) so that each longword received from deserializer 32a via path 42 goes from register A to register B and, then, to register C, with each clock or processing cycle (or otherwise).

In the illustrated embodiment, p is defined by the expression: $p \geq 1 + \text{roundup}((m-1)/n)$, where m and n are defined as discussed above. Selecting p in this manner insures that a sufficient number of longwords are buffered in the registers 44 to permit the MAC units 46 to find a best match, if any, of the pulse bit-pattern (from generator 36) with bit-patterns in the digitized possible reflections (from deserializer 32a), even if those reflections do not fall on longword boundaries.

Multiply and Accumulate Units

Multiply and accumulate (MAC) units 46 are coupled to respective sets of the elements that make up registers 44 to receive successive respective portions of the digital stream 40, as well as to the pattern store 48 to receive the bit-pattern stored in it. Each such portion of the digital stream 40 comprises successive samples of the input signal 38 and includes at least one sample not in the other portions. The successive portions are overlapping but offset from one another by one or more successive samples.

Figure 3A:
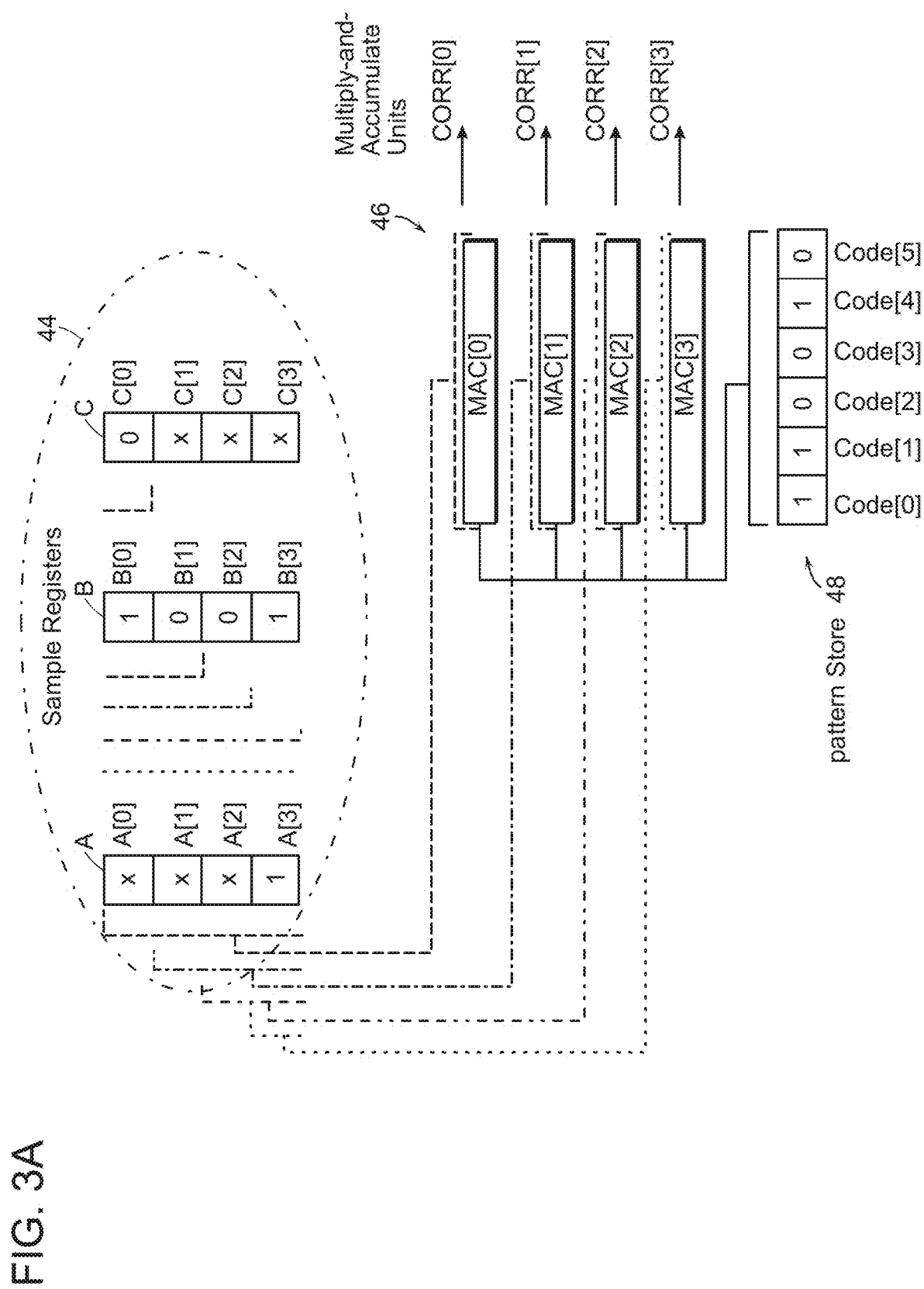
FIG. 3A depicts a search for a match between buffered input samples and a sequence (pattern) in a correlator of FIG. 2.

The foregoing is illustrated in FIG. 3A, showing MAC[0] coupled via logic gates of an FPGA, via hardwiring, or otherwise, to elements A[0], A[1], A[2], A[3], B[0], and B[1] of registers 44; MAC[1] likewise coupled to elements A[1], A[2], A[3], B[0], B[1] and B[2]; MAC[2] to A[2], A[3], B[0], B[1], B[2], and B[3]; and, MAC[3] to A[3], B[0], B[1], B[2], B[3] and C[0]. (Those MAC units 46 are also coupled, again, via logic gates of an FPGA, via hardwiring, or otherwise, to pattern store 48, as shown).

Figure 3B:
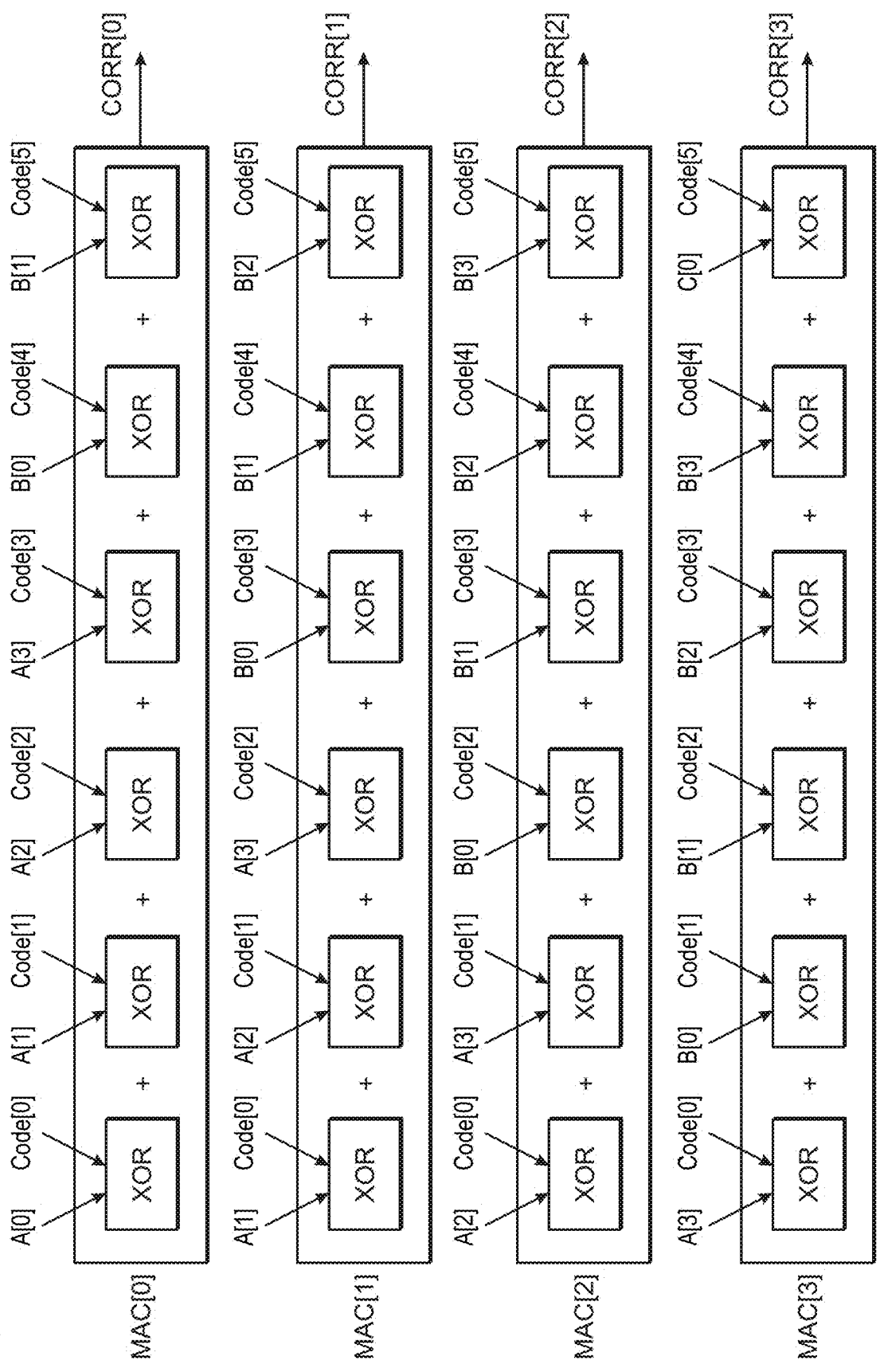
FIG. 3B depicts multiply-and-accumulate (MAC) units in a correlator of the type shown in FIG. 2.

With reference to FIG. 2, each illustrated MAC unit (i) multiples, on a bit-by-bit basis, the values of the respective portion of the digital stream 44 buffered in the elements of the registers 44 to which that MAC unit is coupled with the bit-pattern that is embodied in the multi-bit digital value from waveform generator 36, and (ii) sums the results of those multiplications. As discussed below, the bit-pattern from the waveform generator is used for the multiplications in some embodiments of the invention. Construction of the MAC units 46 is illustrated in greater detail in FIG. 3B, showing an embodiment in which XOR operations are utilized in place of multiplication operations.

An output generated by each MAC based on that sum indicates the degree of correlation between the respective portion of the digital stream—and, thereby, a respective sampling of possible reflections of pulses received by receive logic 14—with the bit-pattern on which the pulses transmitted by logic 12 were based. Those outputs are labeled CORR[0] . . . CORR[3] in the drawings.

In the illustrated embodiment a plurality, k, of MAC units are provided. They are labeled, here, MAC[0] . . . MAC[3], and each is sized to accommodate m logic elements for multiplying (or, alternatively, as discussed below, performing XOR operations on) the m bits of the multi-bit digital value from waveform generator 36 with m bits of the respective portion of the digital stream.

The MAC units, which can be embodied in a stand-alone or common circuit element (as noted above), can be of the type commonly known in the art which multiply and sum their respective inputs. In such embodiments, a larger output is indicative of a higher degree of correlation. In embodiments, such as those illustrated in FIG. 3B for use where the correlations are between bit-patterns, the MAC units are implemented as Boolean exclusive OR operations (XORs). Since an XOR operation has a value of 0 if the compared bits match, a smaller output is indicative a higher degree of correlation. As discussed below, the bit-pattern from the waveform generator is used for the XOR operations in some embodiments of the invention.

The value k is defined by the following expression, in the illustrated embodiment: k=n, if m≤n; else k=rounddown(n/m). Selecting k in this manner insure a sufficient number of MAC units to find a best match, if any, of the pulse bit-pattern (from generator 36) with the successive portions of bit-patterns in the digitized possible reflections (from deserializer 32a), even if they do not fall on longword boundaries.

Through the foregoing arrangement, the MAC units 46 are able to correlate the pulse bit-pattern (from generator 36) with pulses represented in bit-patterns in the digital stream of (digitized) possible reflections (from deserializer 32a), even if those pulses do not fall on longword boundaries. Each successive sample stored in the registers 44 (and utilized by the MAC units) represents the amplitude of the input signal 38 at a different respective time. Once a correlation of sufficiently high degree is found, the time of receipt of the respective portion of the input signal 38 can be determined computationally (based on clock timings of circuitry that implements the deserializer 32a and correlation logic 34) or otherwise.

In the illustrated embodiment, the portions of the digital stream (stored in the registers 44) upon which the respective MAC units 46 operate comprise sets of immediately adjacent samples from the longwords in stream 40. In other embodiments, they may comprise substantially adjacent samples, e.g., every other sample from the digital stream, two out of every three samples, and so forth, without departing from the spirit hereof. Likewise, although in the illustrated embodiment, the successive portions of the digital stream are offset from one another by only one sample, in other embodiments, they may be offset by two or more samples, again, without departing from the spirit hereof.

Bit Pattern Store

The MAC units 46 can be coupled directly to the generator 36 to receive the multi-bit value from it. In the illustrated embodiment, however, the MAC units receive that value from store 48 which, in turn, receives the value from generator 36. The store 48 of the illustrated embodiment, which may be coupled to generator 36 as shown, is of length m, matching that of the digital value(s) generated by the generator 36. Its elements are labeled Code[0] . . . Code[5], here, respectively. The store 48 can be embodied in a stand-alone or common circuit element as noted above. In some embodiments, the store 48 holds a time-reversed value of the multi-bit value from the generator 36 for use in multiplication or XOR operations by the MAC units.

Operation

Operation of the correlation logic 34 is depicted in FIGS. 4A-4E and described below.

Figure 4A:
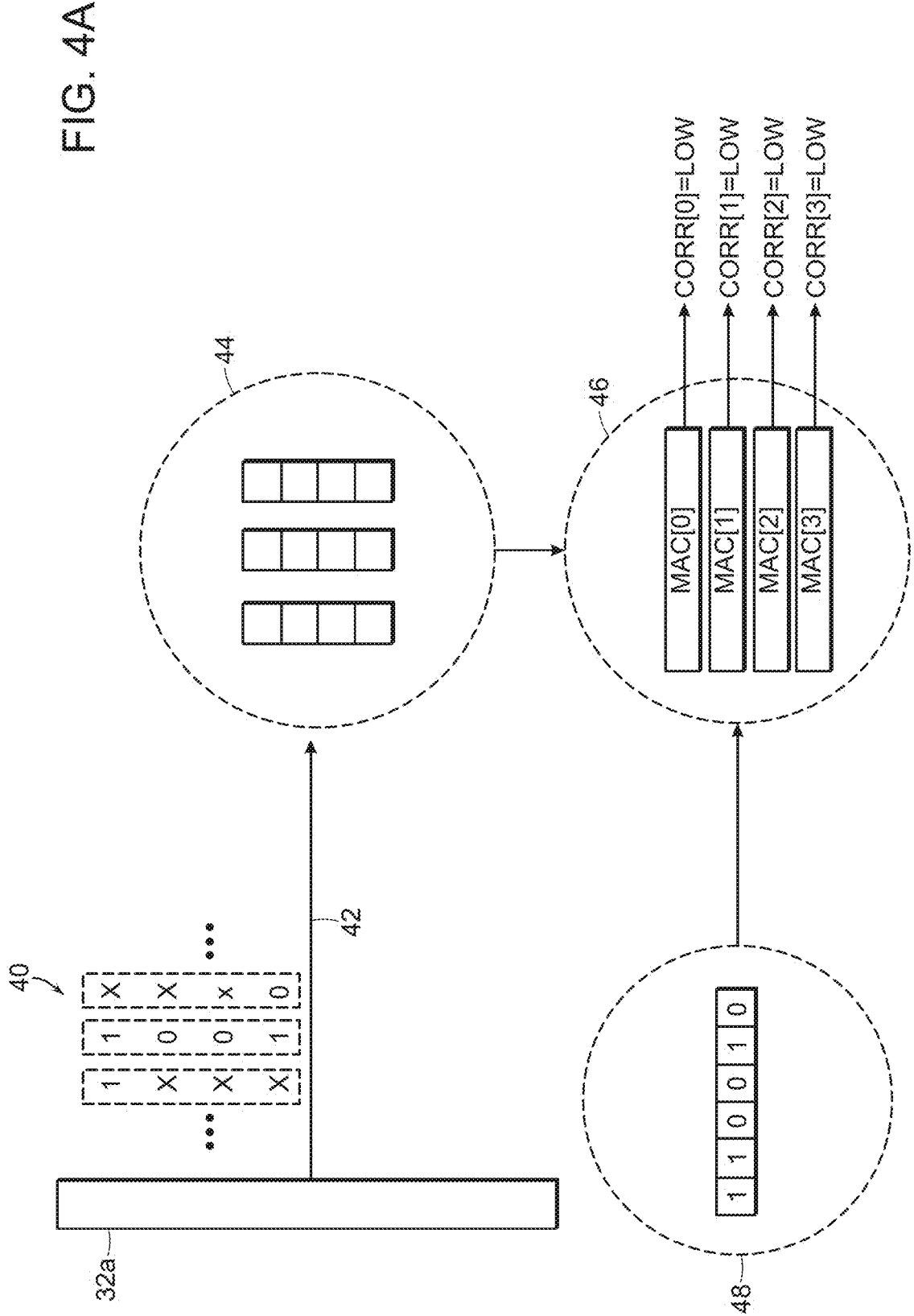

As shown in FIG. 4A, the deserializer 32a generates a digital stream 40 comprising longwords—here, nibbles—comprised of 1's and 0's, each representing the amplitude of a respective sample of the input signal 38 received by logic 12 containing possible pulse reflections. (X's are shown here and in the other drawings to indicate "don't care" with respect to the illustration; in practice, these would be 1's or 0's as well.) Registers 44 are shown as empty in FIG. 4A; though, in practice, they will likely be filled with previously-acquired samples. Store 48 can be pre-loaded with the (time-reversed) pulse bit-pattern value received from waveform generator 36, as shown in the drawing. MAC units 46 can also default to outputting default values of LOW, indicating that there is no correlation between elements of the registers 44 associated with each of those units 46 and the bit-pattern in store 48.

Figure 4B:
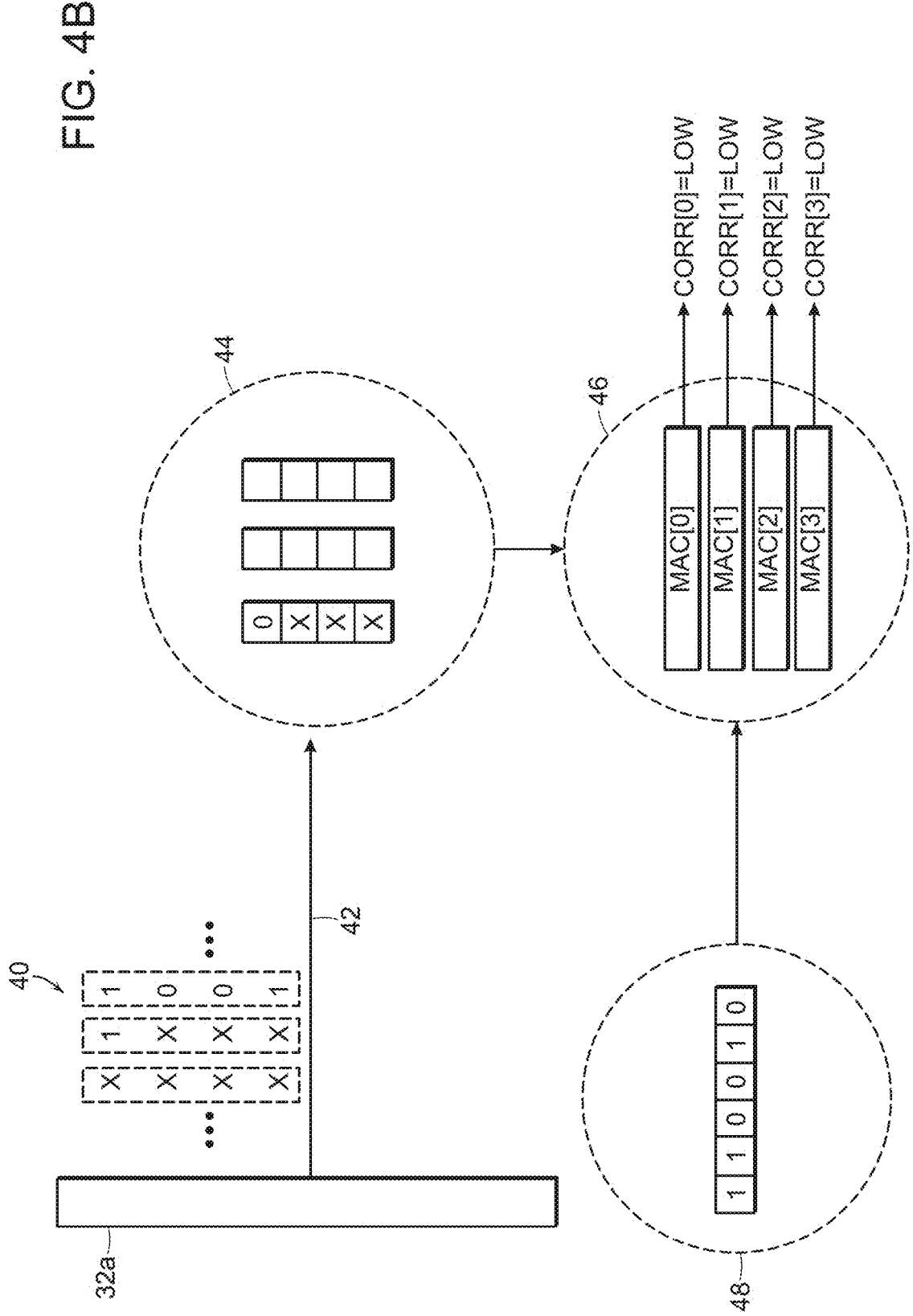

FIG. 4B illustrates a next clock or other processing cycle of operation of logic 34. Here, a first-generated one of the longwords in the digital stream 40 is loaded into the first of the shift registers (register A). The MAC units 46 continue to emit a LOW value output, as above, since there remains no correlation between the elements of the registers 44 associated with each of those units 46 and the bit-pattern in store 48.

FIGS. 4C-4E illustrate the next several clock or processing cycles of operation of logic 34. With each cycle, the contents of the shift registers 44 are shifted from one register to the next, i.e., from register A to register B and, then, to register C, and a new longword from the digital stream 40 is loaded into the first shift register, A. As the contents are shifted, each MAC unit 46 recomputes the correlation between the elements of the registers 44 associated with that unit 46 and the (time-reversed) bit-pattern in store 48.

The MAC units 46 continue to output LOW values, except, during the cycle associated with FIG. 4D. There, MAC[3] is shown as outputting a HIGH value, indicating correlation between the bit-pattern "110010" in store 48 and the pattern "110010" stored in the register elements A[3], B[0], B[1], B[2], B[3] and C[0] associated with that MAC unit (that association is discussed above, and shown in FIGS. 3A and 3B).

Logic that forms part of the range-finding system 10 of which the correlation logic is part can respond to that HIGH value by determining (e.g., as discussed above) the time of receipt of that portion of the input signal 38 containing pulse reflections from which the correlation resulted and, from that, the presence, distance and/or velocity of objects which caused those reflections. The logic required for making such a determination is within the ken of those skilled in the art in view of the teachings hereof.

Examples

Figure 6:
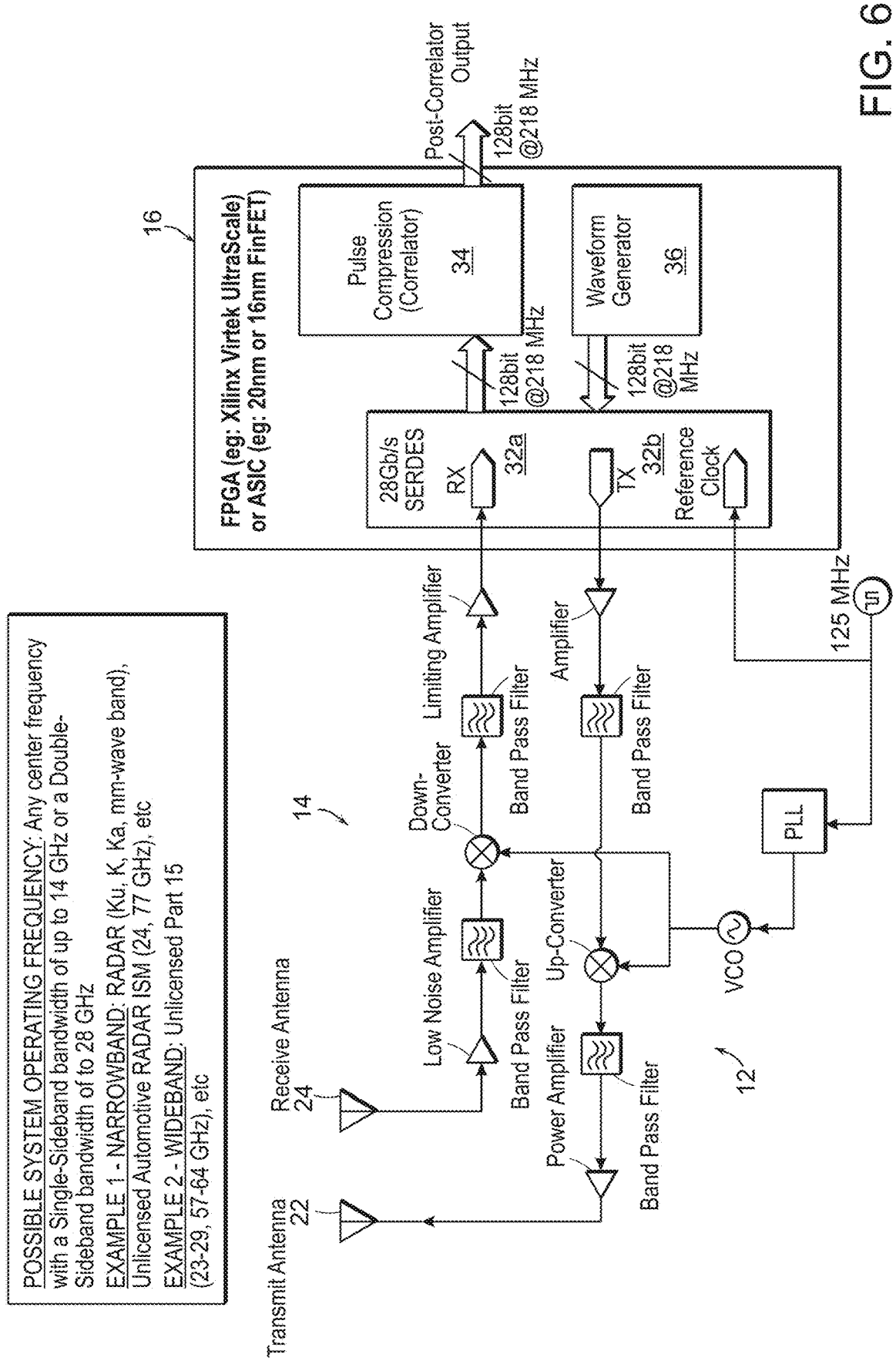
Figure 7:
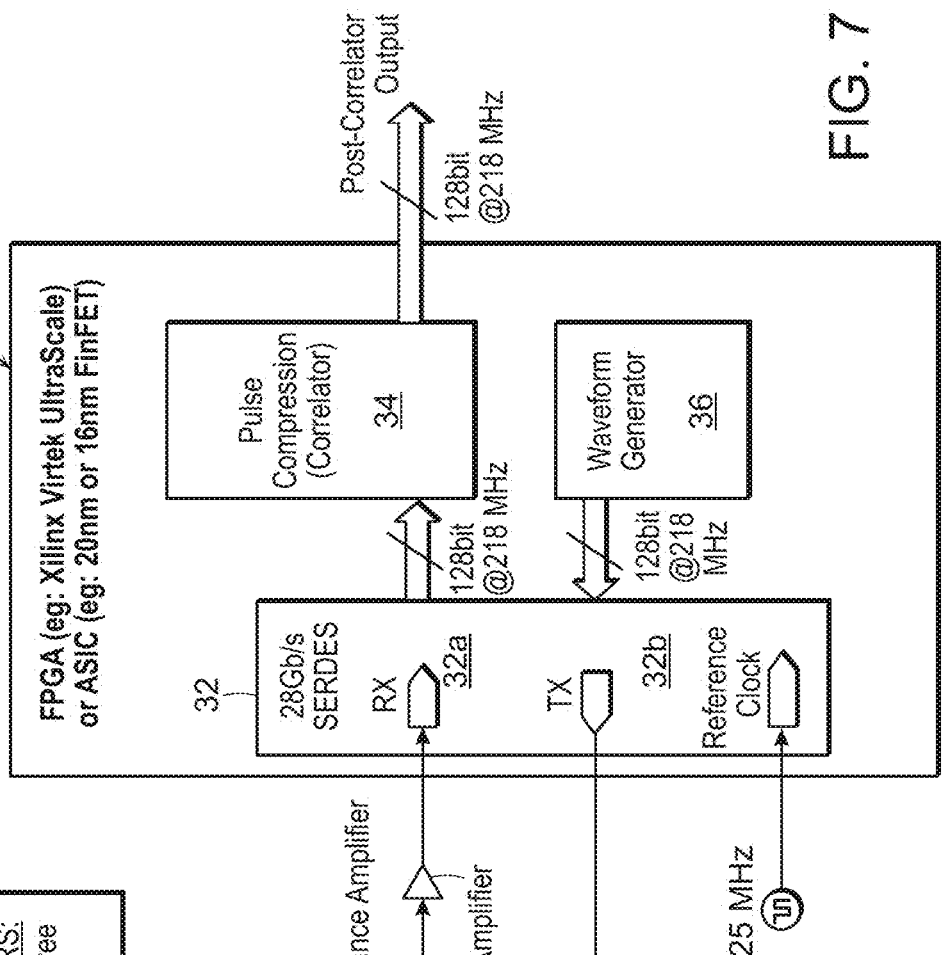
FIG. 7 depicts an embodiment of the invention in a LIDAR application.
Figure 7:
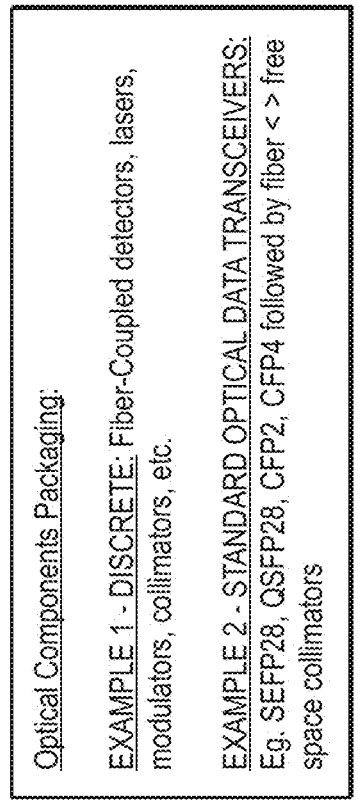

FIGS. 5 and 6 depict embodiments of the invention in direct-to-radio frequency (FIG. 5) and heterodyne—BPSK modulation (FIG. 6) RADAR applications. FIG. 7 depicts an embodiment of the invention in a LIDAR application. Similar designations are used in FIGS. 5-7 as in FIG. 1 to designate elements of like function. Construction and operation of those elements will be evident to those of ordinary skill in the art in view of the teachings above and those that follow.

Features of the embodiments of FIGS. 5-7 include:

1. Use of the serializer 32b, i.e., the "Transmit side" of the SERDES 32, as a 1-bit Digital-To-Analog Converter operating at 28 giga samples per second (GSPS) and with a 14 GHz analog bandwidth.
2. Use of the deserializer 32a, i.e., the "Receive side" of the SERDES 32, as a 1-bit Analog-to-Digital Converter operating at 28 giga samples per second (GSPS) and with a 14 GHz analog bandwidth.
3. Use of the high input/output throughput (several terabits/sec) and logic capacity (over 1 M flip flops) of an FPGA or ASIC to implement signal processing that operates at 28 giga-samples per second (GSPS) to effect functions attributed herein to the SERDES, the correlator 34 and the waveform generators 36, among the other elements discussed above.

A. Detailed operation of the Transmit side of the SERDES 32

The Transmitter (TX) portion 32b of the SERDES acts as a 1-bit DAC operating at 28 GSPS.

Each generated sample is either a positive or a negative going pulse of amplitude 1.1 Vpp delivered into a 100 ohms differential transmission line forming the transmit section 12. The rise/fall time is ~12 picoseconds (ps) with an RMS time jitter of ~8 ps.

In a RADAR application, the system generates waveforms with desirable autocorrelation properties (minimal autocorrelation amplitude at any lag other than zero). One practical example of such waveforms is a Pseudo Random Noise sequence (PRN). In particular, when multiple RADARs are operating in proximity and with the same carrier frequency (e.g., automotive RADAR), the system assigns each RADAR its own PRN sequence which is orthogonal to all others (Viterbi sequences). The sequence can either be stored in memory or it can be generated 'on the fly' with a Linear Feedback Shift Register (LFSR), e.g., that forms part of the waveform generator 36.

Another practical waveform example is the digital approximation of a Chirp. See FIG. 8 depicting a waveform 50 resulting from transmission of the digital sequence 1111000011100011100110010101010 through transmit circuitry of the type shown in FIGS. 1 and 5, by way of example, and discussed above in connection with FIG. 1.

B. Detailed operation of the Receive side 32a of the SERDES 32

The Receive side 32a of the transceiver (SERDES 32) acts as a 1-bit ADC (comparator) operating at 28 GSPS, with a rise/fall time of ~12 ps and an RMS time jitter of ~8 ps. The receiver (RX) 32a input may have a 100 Ohm differential input impedance. In one embodiment, in order to guarantee 1×10e−12 Bit-Error-Rate, the differential amplitude of the input signal is at least 250 mV. In an embodiment the driver amplifiers 28, 30 in front of the RX input brings the desired sampled signal up to at least 250 mV.

The SERDES 32a outputs a Parallel data stream 40 of 128 bit width at a rate of 218 MHz.

In order to guarantee a deterministic latency, all the clock tracking and correction capabilities (Clock & Data Recovery (CDR)) of the SERDES have been disabled.

C. Receive Digital Signal Processing by the Correlator 34:

The correlator 34 runs at a rate of 28 GSPS and features true 28 GHz analog analysis bandwidth. For comparison, an MIT Lincoln Labs state-of-art RADAR from 2011 boasted a principal figure-of-merit of a correlator which ran at only 4 GSPS.

The correlator coefficients, which can be stored in an EEPROM or other memory (not shown) that forms part of and/or is coupled to correlator 34, may be reconfigured by way of applied updates. For comparison, a prior-art Surface-Acoustic-Wave correlator, while capable of running at a comparable 28 GHz analog bandwidth, has its coefficients "etched into its geometry."

D. Operation

The SERDES receiver 32a outputs a stream of 128 bit-wide words at a rate of 218 MHz. Each bit corresponds to a single sample. The least significant bit (LSB) is the first and the most significant bit (MSB) is the last sample to have made it into the RX sampler 32a of the SERDES 32. In order to implement a time-domain correlation, the system performs a Multiply-and-Accumulate operation on the incoming RX sequence with a time-reversed version of the transmitted sequence.

E. Real-Time Operation

One hundred twenty eight (128) Multiply-and-Accumulate units 44 are provided in the illustrated embodiments, operating in parallel, each assigned to one of the 128 possible time-shifts. Multiply-and-Accumulate unit 44 operation is implemented in a pipelined manner:

The first pipeline stages execute per-sample multiplication as a bit wise XOR. This is legal because each sample is only 1-bit in amplitude.

The subsequent pipeline stages accumulate (fold) the results of all the individual XORs.

In order to close timing, embodiments implement enough pipeline stages to achieve a 218 MHz throughput.

Resource utilization for an embodiment as described above is as follows:

A 256 sample-wide real-time correlator consumed 8782 Logic Cells in Xilinx UltraScale technology. This corresponds to 0.7% utilization of a Xilinx Virtex UltraScale VU095.

Based on this, an estimate is fitting up to $10^4$-$10^5$ sample-wide real-time correlator in this device.

F. Non-Real-Time Operation:

In order to implement longer correlators 34, embodiments first store the samples into local memory.

For a quadrature phase shift keying (QPSK) full 28 GHz analog bandwidth design, embodiments use a memory bandwidth of at least 7 GB/sec, such as DDR4. A 128 GB DDR4 memory module will be capable of storing 1×10e12 samples for later correlation offline.

Described above are systems and methods achieving the objects set forth previously, It will be appreciated that the embodiments described herein are merely examples of the invention and that other embodiments, modifying that which is shown and described here, fall within the scope of the invention.

I claim:

1. A signal correlator comprising
correlation logic that correlates a signal pattern with an applied signal, the applied signal comprising a signal that is applied to the correlation logic,
a serializer/deserializer ("SERDES") having a deserializer with an input to which an analog signal is applied,
the deserializer (i) accepting the applied analog signal as if it were a digital stream of bits, (ii) grouping those bits, each comprising a 1-bit digital sample of the analog signal, into longwords, and (iii) generating for application to the correlation logic, a digital stream comprising said longwords, where a longword comprises a 4-bit, 8-bit, 16-bit, 32-bit, 128-bit or other multi-bit unit of data,
wherein the correlation logic comprises a plurality of multiply-and-accumulate (MAC) units, each coupled to receive a respective portion of the digital stream from the deserializer.

2. The signal correlator of claim 1, wherein the deserializer operates as a 1-bit analog-to-digital converter.

3. The signal correlator of claim 1, wherein each 1-bit digital sample represents an amplitude of the analog signal at a different respective time.

4. The signal correlator of claim 1, wherein the applied analog signal is conditioned to attain a differential amplitude of at least 10 mVpp.

5. The signal correlator of claim 1, wherein the applied analog signal is conditioned to attain a differential amplitude of at least 250 mVpp.

6. The signal correlator of claim 1, wherein the deserializer samples the applied analog signal at a rate of at least 3 gigasamples per second (GSPS).

7. The signal correlator of claim 1, wherein the deserializer samples the applied analog signal at a rate of at least 28 gigasamples per second (GSPS).

8. The signal correlator of claim 1, wherein at least one of clock tracking and correction functionality native to the deserializer are disabled.

9. The signal correlator of claim 1, wherein the SERDES is implemented in any of an ASIC and an FPGA.

10. The signal correlator of claim 1, wherein the signal pattern is stored in a memory.

11. The signal correlator of claim 1,
where each portion of the digital stream generated by the deserializer comprises a plurality of successive or substantially successive samples of the analog signal, and
where each portion of the digital stream generated by the deserializer includes at least one sample not in the other portions.

12. The signal correlator of claim 11, wherein the successive respective portions of digital stream generated by the deserializer are overlapping but offset from one another by one or more successive samples.

13. The signal correlator of claim 12, wherein each MAC unit (i) multiplies, on a bit-by-bit basis, its respective portion of the digital stream generated by the deserializer with the signal pattern and (ii) sums results of those multiplications over a plurality of bits that make up that respective portion.

14. In the signal correlator of claim 12, the further improvement wherein where each MAC (i) performs a Boolean exclusive OR (XOR) operation on a bit-by-bit basis between its respective portion of the digital stream generated by the deserializer and the signal pattern and (ii) accumulates results of those XOR operations.

15. An electromagnetic ranging system comprising
transmit logic of the type that transmits a pulse based on an applied analog signal, the applied signal comprising a signal that is applied to the transmit logic,
a serializer/deserializer ("SERDES") having a serializer that is coupled to the transmit logic,
the serializer having an input to which a pattern is applied and an output from which a serialization of the pattern is applied to transmit logic, and
the transmit logic transmitting the pulse based on signal applied from the serializer output,
the SERDES having a deserializer with an input to which a received analog signal is applied,
the deserializer (i) accepting the applied analog signal as if it were a digital stream of bits, (ii) grouping those bits, each comprising a 1-bit digital sample of the analog signal, into longwords and (iii) generating, for application to the correlation logic, a digital stream comprising said longwords, where a longword comprises a 4-bit, 8-bit, 16-bit, 32-bit, 128-bit or other multi-bit unit of data,
the correlation logic comprising a plurality of multiply-and-accumulate (MAC) units, each coupled to receive a respective portion of the digital stream from the deserializer.

16. The system of claim 15, wherein the serializer operates as a 1-bit digital-to-analog converter.

17. The system of claim 16, wherein the serializer converts the pattern into a stream of bits that are represented as positive and negative going pulses, depending on the value of each respective bit, at the output of the serializer.

18. The system of claim 15, wherein the pulses are delivered at an amplitude of 1.1 Vpp at the output of the serializer.

19. The system of claim 15, wherein the pattern is selected so that the pulse transmitted by the transmit logic has desired autocorrelation properties.

20. The system of claim 19, wherein the pattern is selected so that the pulse transmitted by the transmit logic has a minimal autocorrelation amplitude at any lag other than zero.

21. The system of claim 20, wherein the pattern is a pseudo random noise sequence (PRN).

22. The system of claim 15, wherein at least one of the SERDES and the correlator is implemented in any of an ASIC and an FPGA.

23. The system of claim 22, wherein correlator is reconfigurable.

24. The system of claim 23, wherein the pattern is any of stored in a memory that is field-reprogrammable and/or generated on the fly.

25. In a ranging system of the type having transmit logic that transmits a pulse based on an applied analog signal, receive logic that receives an analog signal that is a possible reflection of the pulse, and a correlator that correlates the received signal with a pattern on which the transmitted pulse is based, the improvement comprising
a serializer/deserializer ("SERDES") having a serializer that is coupled to the transmit logic and a deserializer logic that is coupled to the receive logic,
the serializer having an input to which the pattern is applied and an output from which a serialization of the pattern is applied to the transmit logic,
the deserializer having an input to which the analog signal that is a possible reflection of the pulse is applied, the deserializer (i) accepting the applied analog signal as if it were a digital stream of bits, (ii) grouping those bits, each comprising a 1-bit digital sample of the analog signal, into longwords, and (iii) generating, for application to the correlation logic, a digital stream comprising said longwords, where a longword comprises a 4-bit, 8-bit, 16-bit, 32-bit, 128-bit or other multi-bit unit of data,
the correlator comprising a plurality of multiply-and-accumulate (MAC) units, each coupled to receive a respective portion of the digital stream from the deserializer.

26. In the ranging system of claim 25, the further improvement wherein the serializer operates as a 1-bit digital-to-analog converter.

27. In the ranging system of claim 26, the further improvement wherein the serializer converts the pattern into a stream of bits that are represented as positive and negative going pulses, depending on the value of each respective bit, at the output of the serializer.

28. In the ranging system of claim 25, the further improvement wherein the pulses are delivered at an amplitude of 1.1 Vpp at the output of the serializer.

29. In the ranging system of claim 25, the further improvement wherein the pattern is selected so that the pulse transmitted by the transmit logic has desired autocorrelation properties.

30. In the ranging system of claim 29, the further improvement wherein the pattern is selected so that the pulse transmitted by the transmit logic has a minimal autocorrelation amplitude at any lag other than zero.

31. In the ranging system of claim 30, the further improvement wherein the pattern is a pseudo random noise sequence (PRN).

32. In the ranging system of claim 25, the further improvement in which at least one of the SERDES and the correlator is implemented in any of a ASIC and an FPGA.

33. In the ranging system of claim 32, the further improvement in which correlator is reconfigurable.

34. In the ranging system of claim 33, the further improvement in which the pattern is any of stored in a memory that is field-reprogrammable and/or generated on the fly.

35. In the ranging system of claim 25, the further improvement wherein the deserializer operates as a 1-bit analog-to-digital converter.

36. In the ranging system of claim 25, wherein each 1-bit digital sample represents an amplitude of the analog signal at a different respective time.

37. In the ranging system of claim 25, the further improvement in which the applied analog signal is conditioned to attain a differential amplitude of at least 10 mVpp.

38. In the ranging system of claim 25, the further improvement in which the applied analog signal is conditioned to attain a differential amplitude of at least 250 mVpp.

39. In the ranging system of claim 25, the further improvement in which the deserializer samples the applied analog signal at a rate of at least 3 gigasamples per second (GSPS).

40. In the ranging system of claim 25, the further improvement in which the deserializer samples the applied analog signal at a rate of at least 28 gigasamples per second (GSPS).

41. In the ranging system of claim 25, the further improvement in which at least one of clock tracking and correction functionality native to the deserializer are disabled.

42. In the ranging system of claim 25, the further improvement in which the SERDES is implemented in any of an ASIC and an FPGA.

43. In the ranging system of claim 25, the further improvement in which the signal pattern is any of stored in a memory that is field-reprogrammable and/or generated on the fly.

44. In the ranging system of claim 25, the further improvement
wherein the correlation logic comprises a plurality of multiply-and-accumulate (MAC) units, each coupled to receive a respective portion of the digital stream from the deserializer,
where each portion of the digital stream comprises a plurality of successive or substantially successive samples of the analog signal, and
where each portion of the digital stream includes at least one sample not in the other portions.

45. In the ranging system of claim 44, the further improvement wherein the successive respective portions of digital stream are overlapping but offset from one another by one or more successive samples.

46. In the ranging system of claim 45, the further improvement wherein each MAC unit (i) multiplies its respective portion with of the digital stream, on a bit-by-bit basis, with the signal pattern and (ii) sums results of those multiplications over a plurality of bits that make up that respective portion.

47. In the ranging system of claim 45, the further improvement wherein each MAC unit (i) performs a Boolean exclusive OR (XOR) operation on a bit-by-bit basis between its respective portion of the digital stream and the signal pattern and (ii) accumulates results of those XOR operations.

48. A method of operating a signal correlator comprising
correlating, with correlation logic, a signal pattern with an applied signal, the applied signal comprising a signal that is applied to the correlation logic,
generating, with a deserializer of a SERDES (serializer/deserializer) to which an analog signal is applied, a digital stream comprising multi-bit groups of 1-bit digital samples of the analog signal, and applying the digital stream to the correlation logic, the correlation logic comprising a plurality of multiply-and-accumulate (MAC) units, each coupled to receive a respective portion of the digital stream, with each MAC unit (i) performing a Boolean exclusive OR (XOR) operation on a bit-by-bit basis between its respective portion of the digital stream and the signal pattern and (ii) accumulating results of those XOR operations.

49. A method of operating an electromagnetic ranging system comprising transmitting, with transmit logic, a pulse based on an applied signal, the applied signal comprising a signal that is applied to the transmit logic, applying the pattern to a serializer of a SERDES (serializer/deserializer), and applying an output of the serializer to the transmit logic, applying a received analog signal to a deserializer of the SERDES, with the deserializer, generating and applying to correlation logic a digital stream comprising multi-bit groupings of 1-bit digital samples of the received analog signal, the correlation logic comprising a plurality of multiply-and-accumulate (MAC) units, each coupled to receive a respective portion of the digital stream from the deserializer, with each MAC unit (i) performing a Boolean exclusive OR (XOR) operation on a bit-by-bit basis between its respective portion of the digital stream and the signal pattern and (ii) accumulating results of those XOR operations.

50. In a method of operating a ranging system of the type having transmit logic that transmits a pulse based on an applied analog signal, receive logic that receives an analog signal that is a possible reflection of the pulse, and a correlator that correlates the received signal with a pattern on which the transmitted pulse is based, the improvement comprising providing a serializer/deserializer ("SERDES") having a serializer that is coupled to the transmit logic and a deserializer logic that is coupled to the receive logic, applying the pattern to an input of the serializer, and applying the output of the serializer to the transmit logic, applying to an input of the deserializer an analog signal that is a possible reflection of the pulse, and applying an output of the deserializer to the correlator, wherein the output of the deserializer comprises multi-bit groupings of 1-bit digital samples of the applied analog signal, the correlator comprising a plurality of multiply-and-accumulate (MAC) units, each coupled to receive a respective portion of the digital stream from the deserializer, with each MAC unit (i) performing a Boolean exclusive OR (XOR) operation on a bit-by-bit basis between its respective portion of the digital stream and the signal pattern and (ii) accumulating results of those XOR operations.

* * * * *